(12) United States Patent
Mottley et al.

(10) Patent No.: US 12,093,733 B2
(45) Date of Patent: Sep. 17, 2024

(54) SYSTEMS AND METHODS FOR MANAGING CLOUD ENVIRONMENTS

(71) Applicant: Capital One Services, LLC, McLean, VA (US)

(72) Inventors: Clayton Mottley, Alexandria, VA (US); Mark Dysert, McLean, VA (US); Elijah Sattler, Richmond, VA (US); Cynthia Carter, McLean, VA (US); Abhishek Mathews, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 425 days.

(21) Appl. No.: 17/512,709

(22) Filed: Oct. 28, 2021

(65) Prior Publication Data

US 2023/0138900 A1    May 4, 2023

(51) Int. Cl.
*G06F 9/50*     (2006.01)
*G06F 9/48*     (2006.01)
*G06F 11/14*    (2006.01)

(52) U.S. Cl.
CPC .......... *G06F 9/5022* (2013.01); *G06F 9/485* (2013.01); *G06F 9/5055* (2013.01); *G06F 11/1458* (2013.01); *G06F 2201/815* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 8,028,269 | B2 | 9/2011 | Bhatia et al. |
| 9,094,434 | B2 | 7/2015 | Williams et al. |
| 9,239,996 | B2 | 1/2016 | Moorthi et al. |
| 10,019,677 | B2 | 7/2018 | Gill et al. |
| 10,021,138 | B2 | 7/2018 | Gill et al. |
| 10,026,070 | B2 | 7/2018 | Thorpe et al. |
| 10,079,859 | B2 | 9/2018 | Lang et al. |
| 10,249,014 | B2 | 4/2019 | Bala et al. |
| 10,268,493 | B2 | 4/2019 | Thomas et al. |
| 10,826,767 | B2 | 11/2020 | Barkovic et al. |
| 10,853,117 | B2 | 12/2020 | Thomas et al. |
| 2015/0120899 | A1 | 4/2015 | Biddick et al. |

*Primary Examiner* — Wynuel S Aquino
(74) *Attorney, Agent, or Firm* — TROUTMAN PEPPER HAMILTON SANDERS LLP; Christopher J. Forstner; John A. Morrissett (57) ABSTRACT

A system including: one or more processors; a memory storing instructions that, when executed by the one or more processors are configured to cause the system to: scan a plurality of distributed cloud servers to identify a plurality of distributed cloud applications comprising a scheduler configuration file; determine whether each identified distributed cloud application includes a standard or nonstandard environment; shutdown each distributed cloud application of having a standard environment based on a shutdown schedule; reinitialize each distributed cloud application having a standard cloud environment based on the shutdown schedule; create a restore point for each distributed application having a nonstandard environment; convert the nonstandard environments into standard environments; shut down each distributed cloud application having a nonstandard environment, reinitialize each distributed cloud application having a nonstandard environment, and restore the nonstandard cloud environment based on the created restore points.

20 Claims, 5 Drawing Sheets

SYSTEMS AND METHODS FOR MANAGING CLOUD ENVIRONMENTS

FIELD

The disclosed technology generally relates to managing cloud environments, and more particularly systems and methods for shutting down and reinitializing distributed cloud applications that include nonstandard cloud environments that cannot be shutdown without modifying the nonstandard cloud environment into a standard cloud environment.

BACKGROUND

The advent of cloud computing allows for businesses to execute distributed applications on virtual instances over a network (e.g., the Internet). Cloud computing may be utilized to run applications remotely using computer systems, such as a server or collection of servers to provision virtual machines used to execute an application (such as a distributed application) over a network. Cloud computing may allow for the pooling of hardware resources across computer systems allowing for on-demand access to hardware resources (e.g., CPU processing, GPU processing, data storage, bandwidth, etc.) to execute one or more services or applications. The applications may be deployed using virtual machines being executed on the remote hardware, with the hardware resources being provisioned on-demand.

However, an issue with executing applications remotely in a cloud environment is that the distributed application does not always need to be in an active state, according to the needs of the business. Businesses often waste computational resources (or financial resources, when outsourcing the hosting of the cloud environment) by keeping a respective distributed application in an active state on a respective cloud environment. A further issue is that certain cloud environments (e.g., nonstandard cloud environments) cannot be automatically shut down according to a shutdown schedule.

Accordingly, a need exists for a system can automatically shut down and reinitialize distributed applications operating in nonstandard cloud environments according to a predetermined schedule, and upon reinitialization, restore the nonstandard cloud environment of the distributed application using a restore point created during the shutdown process.

The disclosed embodiments are directed to these and other considerations.

SUMMARY

Certain disclosed embodiments provide systems and methods for managing cloud environments.

According to some embodiments, a system for managing cloud environments is disclosed. The system may include one or more processors and a memory in communication with the one or more processors, storing instructions that when executed by the one or more processors are configured to cause the system to perform the steps of a method. The method may include scanning a first plurality of distributed cloud applications to identify a second plurality of distributed cloud applications that include a schedule configuration file. The method may include determining whether each distributed cloud application of the second plurality of distributed cloud applications includes a standard cloud environment or a nonstandard cloud environment. The method may include identifying a first subgroup of distributed cloud applications that include the standard cloud environment and a second subgroup of distributed cloud applications that include a nonstandard cloud environment. The method may include shutting down each distributed application of the first subgroup based on a first plurality of predetermined shutdown schedules associated with each distributed application of the first subgroup. The method may include reinitialize each distributed cloud application of the first subgroup at a predetermined time based on the first plurality of predetermined shutdown schedules. The method may include creating a restore point for each distributed cloud application in the second subgroup, and converting each distributed cloud application in the second subgroup into a standard cloud environment. The method may include shutting down each distributed cloud application of the second subgroup based on a second plurality of predetermined shutdown schedules associated with each distributed application of the second subgroup. The method may include reinitializing each distributed cloud application of the second subgroup at a predetermined time based on the second plurality of predetermined shutdown schedules. After reinitializing each distributed cloud application of the second subgroup, the method can include restoring each distributed cloud application of the second subgroup to the nonstandard cloud environment based on the created restore points.

According to some embodiments, a system for managing cloud environments is disclosed. The system may include one or more processors and a memory in communication with the one or more processors storing instructions that when executed by the one or more processors are configured to cause the system to perform the steps of a method. The method may include scanning a first plurality of distributed cloud applications to identify a second plurality of cloud applications that include a scheduler configuration file. The method may include determining whether each distributed cloud application of the second plurality of cloud distributed cloud applications includes a standard cloud environment or a nonstandard cloud environment. The method may include identifying a first subgroup of distributed cloud applications that include the standard cloud environment and a second subgroup of distributed cloud applications that include the nonstandard cloud environment. The method may include executing a shutdown routine based on a plurality of first schedules. Each of the plurality of first schedules may be determined from a respective scheduler configuration file associated with each distributed cloud application of the first subgroup. The method may include, for each distributed cloud application of the second subgroup, creating a restore point that includes initialization parameters associated with a respective distributed cloud application, converting the nonstandard cloud environment into a standard cloud environment, and executing a shutdown routine based on a plurality of second schedules. Each of the plurality of second schedules may be determined from a respective scheduler configuration file associated with each distributed cloud application of the second subgroup.

According to some embodiments, a method for managing cloud environments is disclosed. The method may include identifying a first plurality of distributed cloud applications including a shutdown schedule. The method may include determining whether each distributed cloud application of the first plurality of distributed applications includes a standard cloud environment or a nonstandard cloud environment. The method may include identifying a first subgroup of distributed cloud applications that have a standard cloud environment and a second subgroup of distributed cloud applications that have the nonstandard cloud environment. For each distributed cloud application of the first subgroup, the method may include executing a shutdown routine based on a respective shutdown schedule associated with each distributed cloud application of the first subgroup, intermittently scanning the shutdown schedule of each distributed cloud application to determine when to reinitialize each distributed cloud application of the first subgroup, and reinitializing each distributed cloud application based on the respective shutdown schedule. For each distributed cloud application of the second subgroup, the method may include creating a restore point including initialization parameters associated with a respective distributed cloud application of the second subgroup, converting the nonstandard cloud environment into a standard cloud environment, executing a shutdown routine based on a shutdown schedule, intermittently scanning the shutdown schedule to determine when to reinitialize each distributed cloud application, and restoring each distributed cloud application using respective initialization parameters associated with each distributed cloud application of the second subgroup, thereby converting each distributed cloud application of the second subgroup into the nonstandard cloud environment.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Examples of the present disclosure generally include systems and methods for managing cloud environments, and more particularly systems and methods for shutting down and reinitializing distributed cloud applications that include nonstandard cloud environments that cannot be shut down without modifying the nonstandard cloud environment into a standard cloud environment The systems and methods are able to create restore points for nonstandard cloud environments, thereby allowing the system to restore the nonstandard cloud environment from a standard cloud environment after reinitializing a given distributed cloud application, which can significantly decrease the costs associated provisioning cloud environments.

The systems and methods described herein are necessarily rooted in computer technology as they relate to improving the functioning of cloud computing systems. Prior cloud computing systems required continuous monitoring to determine when certain cloud instances implanting a distributed cloud application was not in use to determine when to take a respective cloud instance offline to save resources. Additionally, prior cloud computing systems had no way of automatically shutting down and restarting cloud instances that have nonstandard cloud environments. Instead, the present systems and methods facilitate automatically shutting down cloud instances when a distributed cloud application is not in use, reinitializing it when it will be in use, and restoring the nonstandard cloud environment after reinitialization.

Throughout this disclosure, reference is made to instances, which can be understood to mean a "server instance" from a remote computing system. The remote computing system can be understood to be a private or public cloud computing platform. Certain vendors offer these type of cloud platforms, including but not limited to, Amazon RDS®, Google Kubernetes Engine® clusters, and the like.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
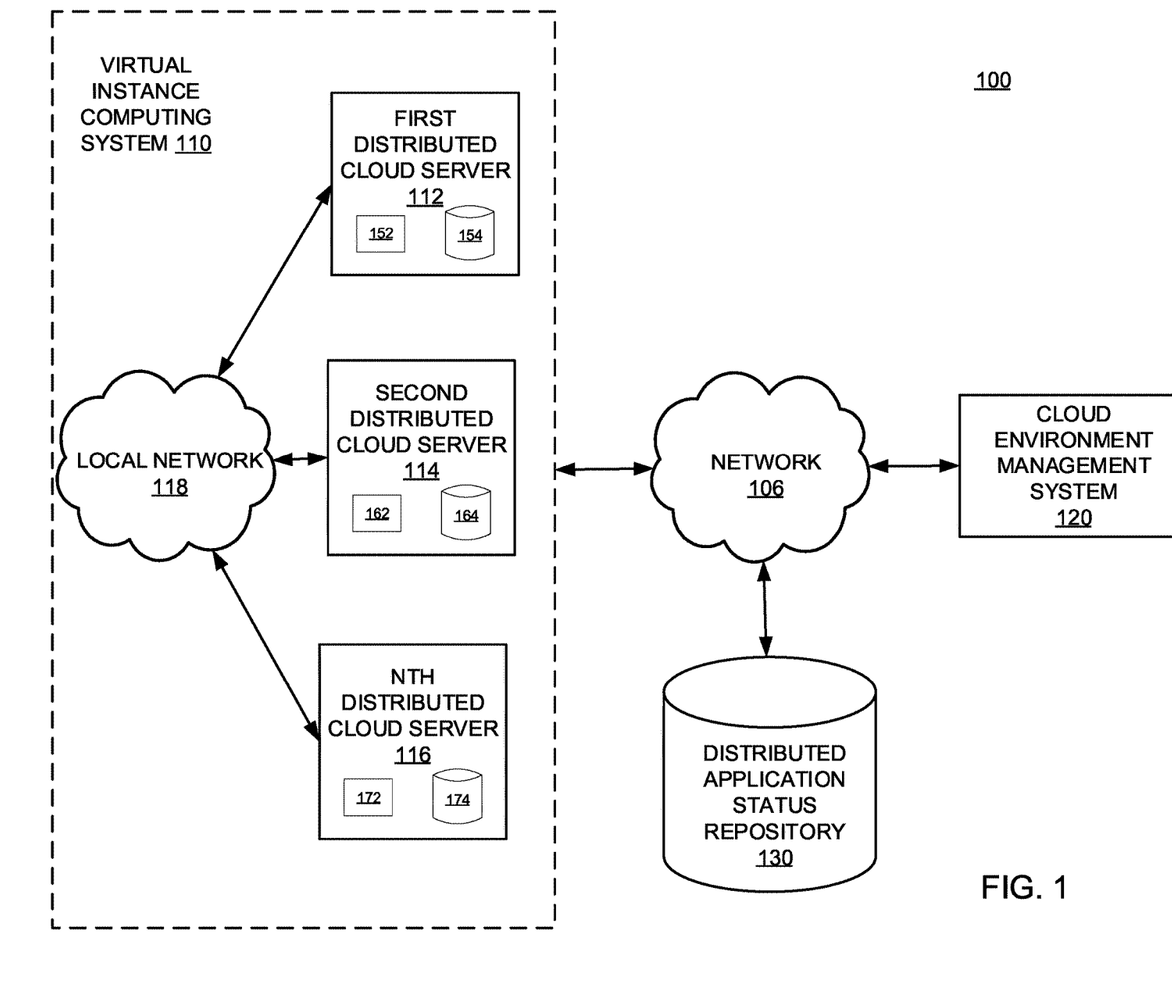
FIG. 1 is a diagram of an example system environment that may be used to implement one or more embodiments of the present disclosure.

In accordance with certain disclosed embodiments, system environment 100 may include a virtual instance computing system 110 in communication with a cloud environment management system 120, and a distributed application status repository 130 via network 106. Cloud environment management system 120 may be a computing device, such as a mobile computing device (e.g., a smart phone, tablet computer, smart wearable device, portable laptop computer, voice command device, wearable augmented reality device, or other mobile computing device) or fixed computing device (e.g., desktop computer). An example architecture that may be used to implement one or more aspects of system 100 is described below with reference to FIG. 2.

Virtual instance computing system 110 may provide cloud computing services. For example, an organization (e.g., associated with cloud environment management system 120 and/or distributed application status repository 130) may utilize virtual instance computing system 110 to execute a plurality of distributed cloud applications. Virtual instance computing system 110 may include a plurality of distributed cloud servers (112, 114, 116), which include respective processors (152, 162, 172) and memories (154, 165, 174). The plurality of distributed cloud servers 112, 114, 116 may be connected either directly, or through a network (e.g., local network 118). Local network 118 may be of any suitable type, including individual connections via the internet such as cellular or Wi-Fi networks. Each of the plurality of distributed cloud servers 112, 114, 116 may execute one or more distributed applications of a plurality of distributed applications. For example, virtual instance computing system 110 may operate a first distributed cloud application on a first distributed cloud server 112, a second distributed cloud application on the second distributed cloud server 114, and nth distributed cloud application on an nth distributed cloud server 116. During periods of nonuse of each distributed cloud application, system 100 may shut down a respective distributed cloud server 112, 114, and/or 116 in order to save hardware resources. In some cases, virtual instance computing system 110 communicates with distributed application status repository 130 to update the status of (e.g., shut down or active) for each distributed cloud application operating on virtual instance computing system 110. According to some embodiments, the status updates may be collected and/or provided in real-time. Additionally, cloud environment management system 120 may communicate with distributed application status repository 130 to store and/or update configuration files associated with each distributed cloud application operating on each distributed cloud server (e.g., 112, 114, 116) on virtual instance computing system 110. According to some embodiments, virtual instance computing system 110 may communicate with distributed application status repository 130 in order to determine when to shut down and reinitialize each distributed cloud application operating on a respective distributed cloud server (e.g., 112, 114, 116) of the virtual instance computing system 110.

Distributed application status repository 130 may store configuration files associated with each distributed cloud application that operates on virtual instance computing system 110. Cloud environment management system 120 may store configuration files on the distributed application status repository 130. Virtual instance computing system 110 may intermittently update the status of each distributed cloud application and store the status on distributed application status repository 130.

Network 106 may be of any suitable type, including individual connections via the internet such as cellular or Wi-Fi networks. In some embodiments, network 106 may connect terminals using direct connections such as radio-frequency identification (RFID), near-field communication (NFC), Bluetooth™, low-energy Bluetooth™ (BLE), Wi-Fi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. One of ordinary skill will recognize that various changes and modifications may be made to system environment 100 while remaining within the scope of the present disclosure. For example, in some cases, distributed application status repository 130 may be implemented in "serverless" forms (e.g., executed within cloud environment management system 120). Moreover, while the various components have been discussed as distinct elements, this is merely an example, and, in some cases, various elements may be combined into one or more physical or logical systems.

Figure 2:
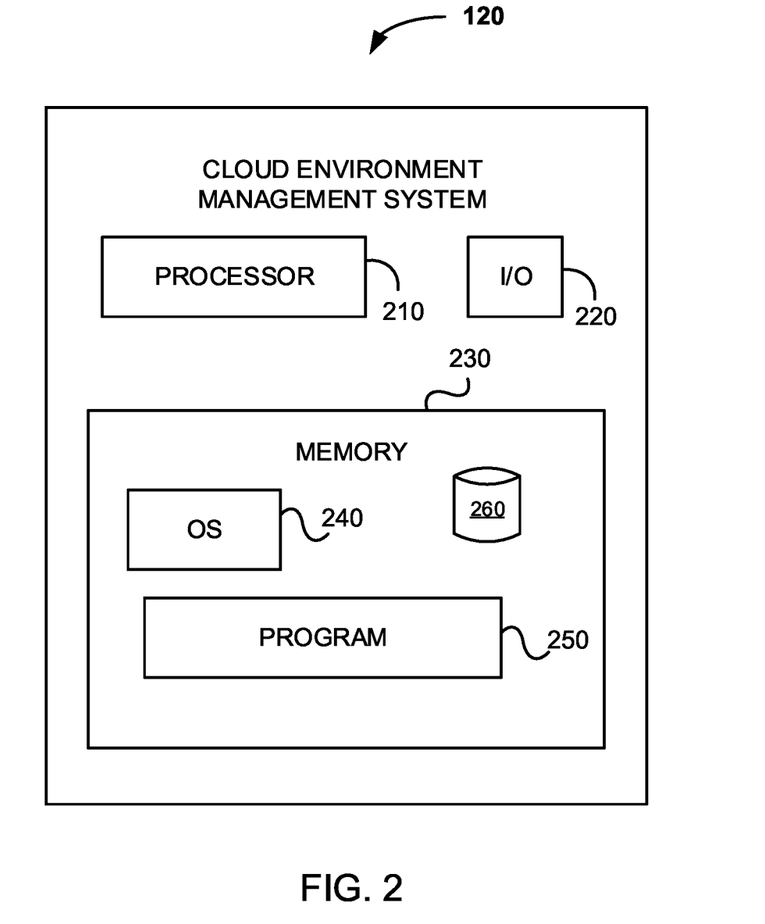
FIG. 2 is a block diagram of a cloud environment managing system, according to an example embodiment.

FIG. 2 is a block diagram (with additional details) of the cloud environment management system 120, as also depicted in FIG. 1. According to some embodiments, distributed application status repository 130, and/or each distributed cloud application (e.g., 112, 114, 116), as depicted in FIG. 1, may have a similar structure and components that are similar to those described with respect to cloud environment management system 120 shown in FIG. 2. As shown, the cloud environment management system 120 may include a processor 210, an input/output ("I/O") device 220, a memory 230 containing an operating system ("OS") 240 and a program 250. In certain example implementations, the cloud environment management system 120 may be a single server or may be configured as a distributed computer system including multiple servers or computers that interoperate to perform one or more of the processes and functionalities associated with the disclosed embodiments. In some embodiments, the cloud environment management system 120 may further include a peripheral interface, a transceiver, a mobile network interface in communication with the processor 210, a bus configured to facilitate communication between the various components of the cloud environment management system 120, and a power source configured to power one or more components of the cloud environment management system 120.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the cloud environment management system 120 may include one or more storage devices configured to store information used by the processor 210 (or other components) to perform certain functions related to the disclosed embodiments. In one example, the cloud environment management system 120 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the cloud environment management system 120 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the cloud environment management system 120 may include the memory 230 that may include one or more programs 250 to perform one or more functions of the disclosed embodiments. For example, in some embodiments, the cloud environment management system 120 may additionally manage shutdown and/or initialization schedules with the virtual instance computing system 110 via a program 250.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing related data to enable the scaling recommendation engine 120 to perform one or more of the processes and functionalities associated with the disclosed embodiments.

Database 260 may include stored data relating to each distributed application being executed on virtual instance computing system 110. Database 260, according to some embodiments, may store information related to distributed application status which are stored by distributed application status repository 130 in other embodiments. In some embodiments, database 260 may also include, for each distributed application, configuration files associated with each distributed cloud application, which may be received from cloud environment management system 120.

The cloud environment management system 120 may also be communicatively connected to one or more memory devices (e.g., databases) locally or through a network. The remote memory devices may be configured to store information and may be accessed and/or managed by the cloud environment management system 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The cloud environment management system 120 may also include one or more I/O devices 220 that may comprise one or more interfaces for receiving signals or input from devices and providing signals or output to one or more devices that allow data to be received and/or transmitted by the cloud environment management system 120. For example, the cloud environment management system 120 may include interface components, which may provide interfaces to one or more input devices, such as one or more keyboards, mouse devices, touch screens, track pads, trackballs, scroll wheels, digital cameras, microphones, sensors, and the like, that enable the cloud environment management system 120 to receive data from one or more distributed cloud servers (e.g., 112, 114, and/or 116).

In example embodiments of the disclosed technology, the cloud environment management system 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the cloud environment management system 120 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc.

Furthermore, other implementations of the scaling recommendation engine 120 may include a greater or lesser number of components than those illustrated.

Figure 3A:
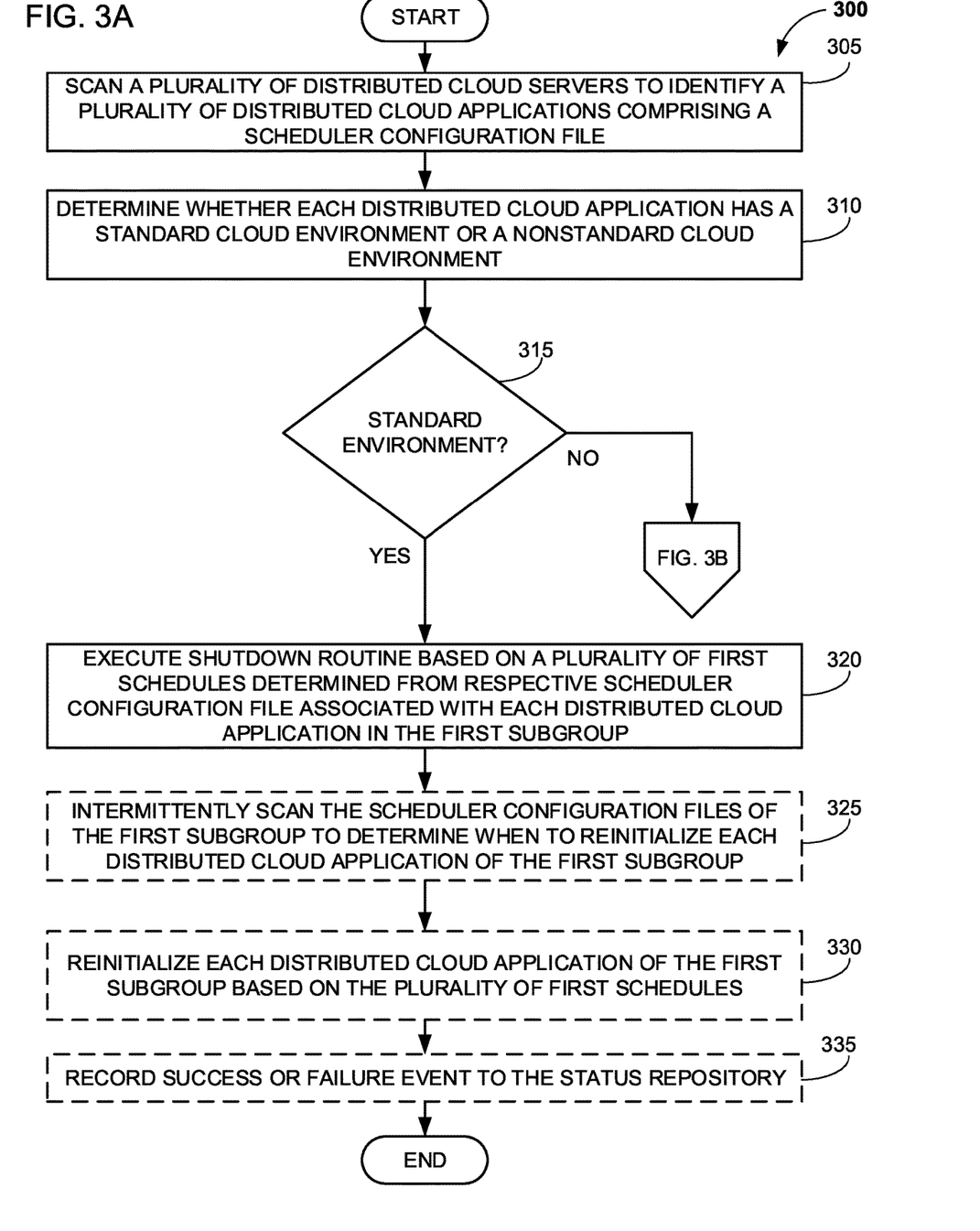
FIG. 3A is a flowchart of a method of shutting down and reinitializing a distributed application having a standard cloud environment, according to an example embodiment.

FIG. 3A is a flowchart 300 of a method of shutting down and reinitializing a distributed application having a standard cloud environment, according to an example embodiment. Referring to FIG. 3A, in block 305 the method may include scanning a plurality of distributed cloud servers (e.g., 112, 114, and/or 116) to identify a plurality of distributed cloud applications that include a related scheduler configuration file. For example, cloud environment management system 120 can query each distributed cloud application (e.g., 112, 114, and/or 116) of virtual instance computing system 110 to determine a distributed cloud application identifier for each distributed cloud application. Once cloud environment management system 120 determines a distributed cloud application identifier for each distributed cloud application operating on virtual instance computing system 110, cloud environment management system 120 may query distributed application status repository 130 (and/or database 260 of cloud environment management system 120) to identify associated scheduler configuration files. Not every distributed cloud application operating on virtual instance computing system 110 may have an associated scheduler configuration file. The scheduler configuration files may be used by system 100 to determine which distributed applications need to be shut down and reinitialized on a schedule based on periods of nonuse.

In block 310, the method may include determining whether each distributed cloud application of the plurality of distributed cloud applications includes a standard environment or a nonstandard cloud environment. For example, a nonstandard environment may include a multi-server cloud environment. A multi-server cloud environment can be understood as a distributed application that operates on more than one virtual instance of virtual instance computing system 110. For example, a distributed cloud application can be implemented on more than one distributed cloud server (e.g., 112, 114, 116) simultaneously. Multi-server cloud environments may be used to split traffic between distinct geographic regions and to provide a level of redundancy and increased throughput for distributed applications in case one copy goes offline due to a hardware failure or otherwise. In another example, a nonstandard environment can also include read-replica cloud environments. A read-replica cloud environment can be understood as a distributed application that operates fully on a first distributed cloud server, allowing data to both be read and written from the first distributed cloud server, while additionally deploying a "read-only" copy of the respective distributed application on a second distributed cloud server that is linked to the first distributed cloud server. In some embodiments, to determine whether a respective distributed application is operating in a standard cloud environment or a nonstandard cloud environment, the cloud environment management system 120 may identify a distributed cloud application identifier associated with each distributed cloud application. The cloud environment management system 120 may then query the distributed application status repository 130 (and/or database 260) to look up the cloud environment status (e.g., standard, read replica, and/or multi-server) of each respective distributed cloud application.

In decision block 315, the system may determine a first and a second subset of distributed applications based on whether a respective distributed application operates in a standard or nonstandard cloud computing environment. Accordingly, the system may identify a first subgroup of distributed cloud applications that operate in a standard cloud environment and a second subgroup of distributed cloud applications that operate in a nonstandard cloud environment. For each distributed application determined to be in the first subgroup (e.g., operating in a standard cloud environment), the method may move to block 320. For each distributed application determined to be in the second subgroup (e.g., operating in a nonstandard cloud environment), the method may move to block 340 (discussed with respect to FIG. 3B).

In block 320, the system (e.g., cloud environment management system 120) may execute a shutdown routine based on a plurality of first schedules determined from respective scheduler configuration files associated with each distributed cloud application in the first subgroup. For example, cloud environment management system 120 may use distributed cloud application identifier(s) determined in blocks 305-310 to query distributed application status repository 130 to identify corresponding scheduler configuration files. Each scheduler configuration file may include a schedule associated with scheduled uptime and downtime for a respective distributed application operating on virtual instance computing system 110. Accordingly, cloud environment management system 120 may transmit instructions to virtual instance computing system 110 to shut down each identified distributed cloud application. In response, virtual instance computing system 110 may shut down each identified distributed cloud application. Additionally, virtual instance computing system 110 may update the status of each shut down distributed application within the distributed application status repository 130. For example, a new record corresponding to each distributed cloud application identifier may be generated by combining the distributed cloud application identifier with a shutdown execution start time identifier to create a unique record to indicate that a distributed cloud application associated with the distributed cloud application identifier has been shut down at a particular time. The shutdown execution start time identifier may ensure that each record stored on distributed application status repository 130 is unique and not overridden.

In optional block 325, the system (e.g., cloud environment management system 120) may intermittently scan the scheduler configuration files associated with each distributed cloud application associated with the first subgroup to determine when to reinitialize each distributed cloud application of the first subgroup. For example, cloud environment management system 120 may intermittently query distributed application status repository 130. According to some embodiments, cloud environment management system 120 may query the distributed application status repository once every fifteen minutes, once every thirty minutes, once every 45 minutes, once every hour, or any other regular interval as determined by the scheduler configuration file.

In optional block 330, the system (e.g., cloud environment management system 120) may reinitialize each distributed cloud application associated with the first subgroup based on the plurality of first schedules. For example, cloud environment management system 120 may determine, based on a respective configuration file associated with a distributed application operating on virtual instance computing system 110, that it is the correct time to reinitialize a distributed cloud application. Accordingly, cloud environment management system 120 may transmit instructions to the virtual instance computing system 110 to restart the operation of a first distributed cloud application on first distributed cloud server 112, a second distributed cloud application on second distributed cloud server 114, and $n^{th}$ distributed cloud application on $n^{th}$ distributed cloud server 116. Additionally, virtual instance computing system 110 may update the status of each reinitialized distributed application within the distributed application status repository 130. For example, a new record corresponding to each distributed cloud application identifier may be generated by combining the distributed cloud application identifier with an initialization execution start time identifier to create a unique record to indicate that a distributed cloud application associated with the distributed cloud application identifier has been reinitialized at a particular time. The initialization execution start time identifier may ensure that each record stored on distributed application status repository 130 is unique and not overridden. In some embodiments, rather than creating a new record corresponding to the reinitialized status of a respective distributed application within the distributed application status repository 130, the system may instead locate the shutdown record of the respective reinitialized distributed application and update the shut down record with a reinitialized status once the distributed cloud application has been reinitialized.

In optional block 335, the system (e.g., virtual instance computing system and/or cloud environment management system 120) may record a success or failure event to distributed application status repository 130. Accordingly, distributed application status repository 130 may always include up to date information regarding the status (e.g., a successful or failed reinitialization) for each distributed application operating on virtual instance computing system 110.

Figure 3B:
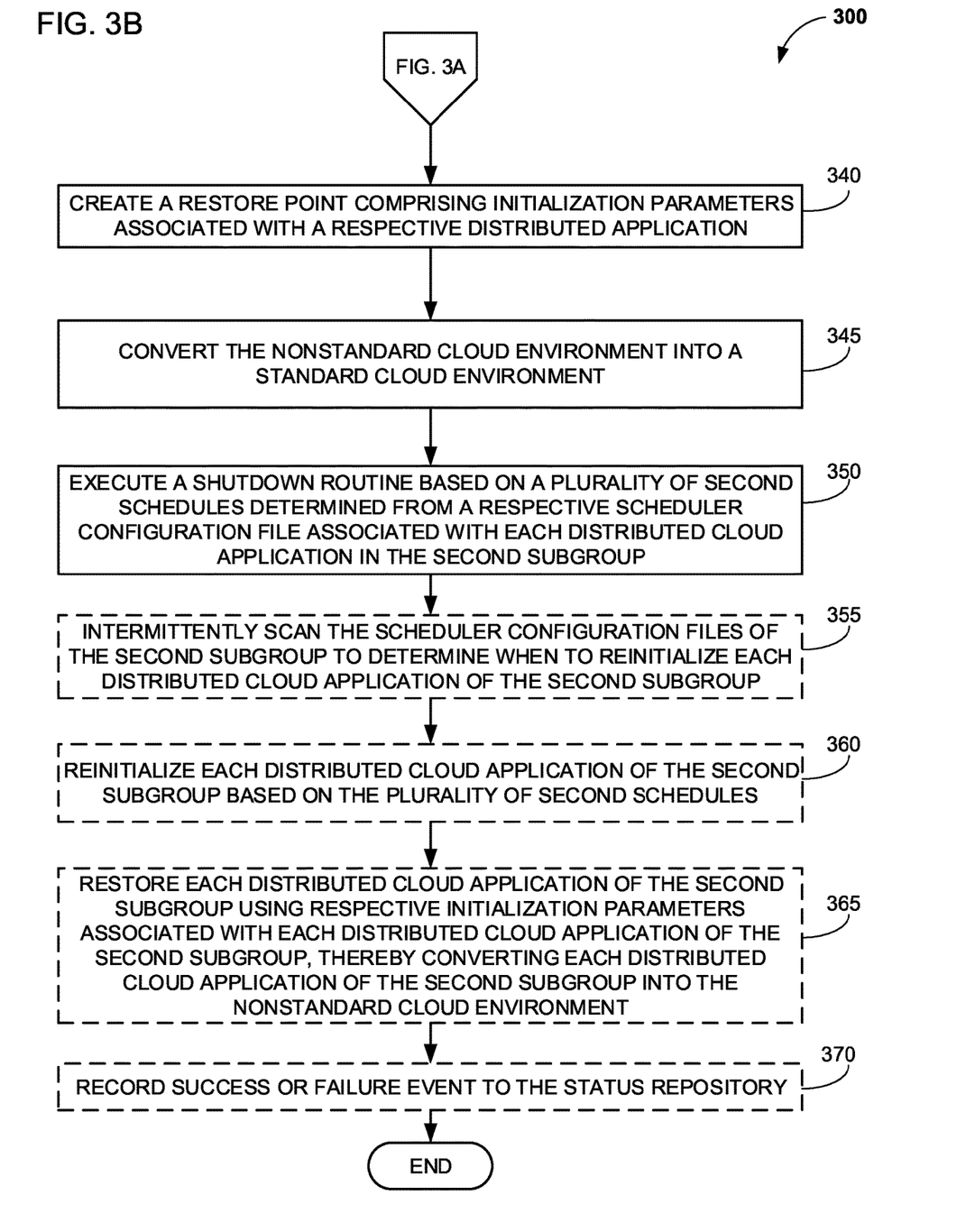
FIG. 3B is a flowchart of a method of shutting down and reinitializing a distributed application having a nonstandard cloud environment, according to an example embodiment.

FIG. 3B is a flowchart 300 of a method of shutting down and reinitializing a distributed application having a nonstandard cloud environment, according to an example embodiment. After determining that a distributed cloud application operates on a nonstandard cloud environment in decision block 315, the method may move to block 340, as shown in FIG. 3B. Certain blocks of FIG. 3B are substantially similar to blocks of FIG. 3A. For example, blocks 350, 355, 360, and 370 are substantially similar to blocks 320, 325, 330, and 335 respectively, and a full description of these blocks is omitted here for brevity. In block 340, the system may create a restore point including initialization parameters associated with a respective distributed application. For example, cloud environment management system 120 may send instructions to virtual instance computing system 110 to create a backup file for each distributed application operating in a nonstandard cloud environment that is scheduled to be shutdown. The backup file may include initialization parameters, such as whether the respective distributed application operates in a multi-server cloud environment and/or whether there are any read replicas associated with the distributed application. The initialization parameters may include read replica configuration, multi-server configuration, security group settings, (e.g., which users have full and/or partial access to a respective distributed application), and parameter group settings (e.g., parameter configuration files that can be applied to one or more distributed cloud servers 112, 114, 116 of virtual instance computing system 110).

In block 345, the system may convert each identified nonstandard environment into a standard cloud environment. As part of converting nonstandard cloud environments into standard cloud environments, cloud environment management system 120 may determine whether a respective For example, for each distributed application identified as operating on a multi-server cloud environment may be converted into a single-server cloud environment by deleting one of the distributed application copies. For example, if distributed cloud application A is operating on a first distributed cloud server 112 and second distributed cloud server 114, one of the copies stored on either first distributed cloud server 112 or second distributed cloud server 114 may be deleted, thereby converting distributed cloud application A into a standard cloud environment. According to certain embodiments, the cloud environment management system 120 may cause the virtual instance computing system 110 to convert a multi-server cloud environment into a single-server cloud environment by issuing a "modify database instance" command. In another example, the system may delete read-replicas associated with a respective distributed application. For example, cloud environment management system 120 may query distributed application status repository 130 with a respective distributed cloud application identifier. The distributed application status repository may return a related read-replica identifier associated with the provided distributed cloud application identifier. Using the read-replica identifier, cloud environment management system 120 may transmit instructions to the virtual instance computing system 110 to delete the read-replica copy associated with the distributed cloud application. According to certain embodiments, the cloud environment management system 120 may cause the virtual instance computing system 110 to delete the read-replica by issuing a "delete database instance" command.

In block 365, the system (e.g., cloud environment management system 120 and/or virtual instance computing system 110) may restore each distributed cloud application of the second subgroup using respective initialization parameters associated with each distributed cloud application of the second subgroup, thereby converting each distributed cloud application of the second subgroup into the nonstandard cloud environment. For example, cloud environment management system 120 may query distributed application status repository 130 for initialization parameters associated with each distributed cloud application to be reinitialized. Accordingly, cloud environment management system 120 may transmit instructions to virtual instance computing system 110 to restore each distributed cloud application operating on a respective distributed cloud server (e.g., 112, 114, 116, etc.) based on the initialization parameters derived from distributed application status repository 130. According to some embodiments, the system (e.g., cloud environment management system 120) may restore each distributed cloud application of the second subgroup by issuing a command to the virtual instance computing system 110 to return the current state of each distributed cloud application of the second subgroup, for example by issuing a "describe database instances" command for each distributed cloud application of the second subgroup. Then, the returned current state of each distributed cloud application of the second subgroup may be directly compared to the respective restore points stored on the distributed application status repository 130. After determining the difference between the current state and the state described by the restore points stored on distributed application status repository 130, the system may use the initialization parameters stored in the respective restore points to restore the nonstandard cloud environments of each distributed cloud application of the second subgroup.

Figure 4:
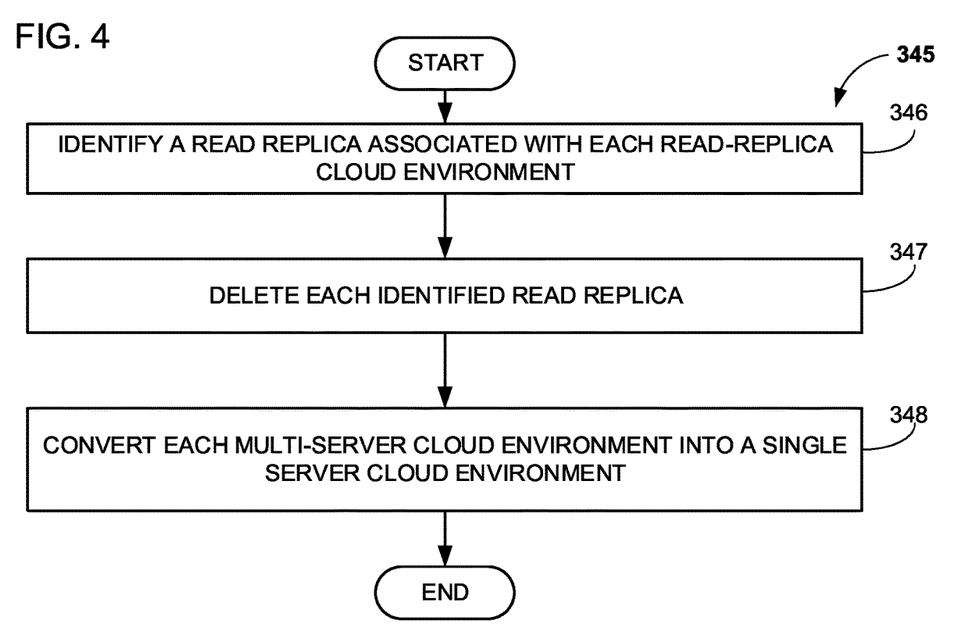
FIG. 4 is a flowchart of a method of converting nonstandard cloud environments into standard cloud environments, according to certain example embodiments.

FIG. 4 is a flowchart 345 showing a method of converting nonstandard cloud environment into standard cloud environments, according to certain example embodiments. In block 346, the system (e.g., cloud environment management system 120) may identify a read-replica associated with each read-replica cloud environment (e.g., nonstandard). In block 347, the system may delete each identified read-replica. For example, cloud environment management system 120 may provide instructions to the virtual instance computing system 110 to delete each identified read-replica. In block 348, the system may convert each multi-server cloud environment into a single server cloud environment. After block 348, method 345 may end.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLE USE CASES

The following example use cases describe examples of a use of systems and methods for managing cloud environments. These example use cases are intended solely for explanatory purposes and not for limitation. In one case, an organization may wish to efficiently use resources by automating the shutdown and reinitialization of certain distributed cloud applications operating in a cloud environment. For example, one or more distributed applications operating in a quality assurance or test environment may not need to be active at all times. Rather, at times when the organization is not actively working, these instances may be shut down to save computational resources. The system may identify one or more distributed applications that include a configuration file specifying a shutdown schedule. The system may determine whether each distributed application having a shutdown schedule is operating in a standard or nonstandard environment. Applications operating in a standard environment are automatically shut down and restored at the appropriate time based on a respective configuration file. For each distributed application operating in a nonstandard environment, a restore point is created and saved, and the nonstandard environment is converted into a standard environment and shut down as required by the respective configuration file associated with the respective distributed application. At the appropriate time, the distributed applications operating in the nonstandard environment are reinitialized and restored from a standard environment to a nonstandard environment according to the restore point.

Examples of the present disclosure can be implemented according to at least the following clauses:

Clause 1: A system for managing cloud environments, comprising: one or more processors; a memory in communication with the one or more processors, having instructions that when executed by the one or more processors are configured to cause the system to: scan a first plurality of distributed cloud applications to identify a second plurality of distributed cloud applications comprising a scheduler configuration file; for each distributed cloud application of the second plurality of distributed cloud applications, determine whether each distributed cloud application comprises a standard cloud environment or a nonstandard cloud environment; identify a first subgroup of distributed cloud applications comprising the standard cloud environment and a second subgroup of distributed cloud applications comprising the nonstandard cloud environment; shutdown each distributed cloud application of the first subgroup based on a first plurality of predetermined shutdown schedules associated with each distributed application of the first subgroup; reinitialize each distributed cloud application of the first subgroup at a predetermined time based on the first plurality of predetermined shutdown schedules; create a restore point for each distributed cloud application in the second subgroup; convert each distributed cloud application in the second subgroup into a standard cloud environment; shutdown each distributed cloud application of the second subgroup based on a second plurality of predetermined shutdown schedules associated with each distributed application of the first subgroup; reinitialize each distributed cloud application of the second subgroup at a predetermined time based on the second plurality of predetermined shutdown schedules; and restore each distributed cloud application of the second subgroup to the nonstandard cloud environment based on the created restore points.

Clause 2: The system of clause 1, wherein converting each nonstandard cloud environment into standard cloud environment further comprises determining whether each of the distributed cloud applications of the second subgroup comprise either a read-replica cloud environment or a multi-server cloud environment.

Clause 3: The system of clause 2, wherein converting each nonstandard cloud environment into a standard cloud environment further comprises converting each multi-server cloud environment of the second subgroup into a single-server cloud environment.

Clause 4: The system of clause 2, wherein converting each nonstandard cloud environment into a standard cloud environment further comprises: identifying a read replica associated with each read-replica cloud environment; and deleting the read replica associated with each read-replica cloud environment.

Clause 5: The system of clause 4, wherein identifying the read replica associated with each read-replica cloud environment further comprises: scanning each read replica of a plurality of existing read-replicas for a source identifier; comparing the source identifier to a respective cloud environment identifier associated with each of the distributed cloud applications of the second subgroup; and matching the read replica to one of the distributed cloud applications of the second subgroup based on the source identifier matching the respective cloud environment identifier beyond a predetermined threshold.

Clause 6: The system of clause 1, wherein intermittently scanning the scheduler configuration files occurs once every fifteen minutes.

Clause 7: The system of clause 1, wherein the scheduler configuration files allow the distributed cloud applications to be initialized or shutdown at a time selected from at a beginning of an hour period, 15 minutes past the hour period, 30 minutes past the hour period, or 45 minutes past the hour period.

Clause 8: The system of clause 1, wherein the instructions, when executed by the one or more processors are configured to cause the system to: responsive to a successful reinitialization of a respective distributed cloud application, record a success event to a reporting database confirming that the respective distributed cloud application has been successfully reinitialized; responsive to a non-successful reinitialization of a respective distributed cloud application, record a failure event to the reporting database.

Clause 9: A system for managing cloud environments, comprising: one or more processors; a memory in communication with the one or more processors, having instructions that when executed by the one or more processors are configured to cause the system to: scan a first plurality of distributed cloud applications to identify a second plurality of distributed cloud applications comprising a scheduler configuration file; for each distributed cloud application of the second plurality of distributed cloud applications, determine whether each distributed cloud application comprises a standard cloud environment or a nonstandard cloud environment; identify a first subgroup of distributed cloud applications comprising the standard cloud environment and a second subgroup of distributed cloud applications comprising the nonstandard cloud environment; for each distributed cloud application of the first subgroup, execute a shutdown routine based on a plurality of first schedules, each of the plurality of first schedules determined from a respective scheduler configuration file associated with each distributed cloud application of the first subgroup; for each distributed cloud application of the second subgroup: create a restore point comprising initialization parameters associated with a respective distributed cloud application; convert the nonstandard cloud environment into a standard cloud environment; and execute a shutdown routine based on a plurality of second schedules, each of the plurality of second schedules determined from a respective scheduler configuration file associated with each distributed cloud application of the second subgroup.

Clause 10: The system of clause 9, wherein the instructions, when executed by the one or more processors are configured to cause the system to: for each distributed cloud application of the first subgroup: intermittently scan the scheduler configuration files of the first subgroup to determine when to reinitialize each distributed cloud application of the first subgroup; and reinitialize each distributed cloud application of the first subgroup based on the plurality of first schedules; for each distributed cloud application of the second subgroup: intermittently scan the scheduler configuration files of the second subgroup to determine when to reinitialize each distributed cloud application of the second subgroup; reinitialize each distributed cloud application of the second subgroup based on the plurality of second schedules; and restore each distributed cloud application of the second subgroup using respective initialization parameters associated with each distributed cloud application of the second subgroup, thereby converting each distributed cloud application of the second subgroup into the nonstandard cloud environment.

Clause 11: The system of clause 10, wherein converting each nonstandard cloud environment into standard cloud environment further comprises determining whether each of the distributed cloud applications of the second subgroup comprise either a read-replica cloud environment or a multi-server cloud environment.

Clause 12: The system of clause 11, wherein converting each nonstandard cloud environment into a standard cloud environment further comprises converting each multi-server cloud environment of the second subgroup into a single-server cloud environment.

Clause 13: The system of clause 11, wherein converting each nonstandard cloud environment into a standard cloud environment further comprises: identifying a read replica associated with each read-replica cloud environment; and deleting the read replica associated with each read-replica cloud environment.

Clause 14: The system of clause 13, wherein identifying the read replica associated with each read-replica cloud environment further comprises: scanning each read replica of a plurality of existing read-replicas for a source identifier; comparing the source identifier to a respective cloud environment identifier associated with each of the distributed cloud applications of the second subgroup; and matching the read replica to one of the distributed cloud applications of the second subgroup based on the source identifier matching the respective cloud environment identifier beyond a predetermined threshold.

Clause 15: The system of clause 10, wherein intermittently scanning the scheduler configuration files occurs once every fifteen minutes.

Clause 16: The system of clause 10, wherein the scheduler configuration files allow the distributed cloud applications to be initialized or shutdown at a time selected from at a beginning of an hour period, 15 minutes past the hour period, 30 minutes past the hour period, or 45 minutes past the hour period.

Clause 17: The system of clause 10, wherein the instructions, when executed by the one or more processors are configured to cause the system to: responsive to a successful reinitialization of a respective distributed cloud application, record a success event to a reporting database confirming that the respective distributed cloud application has been successfully reinitialized; responsive to a non-successful reinitialization of a respective distributed cloud application, record a failure event to the reporting database.

Clause 18: A method for managing cloud environments, comprising: identifying a first plurality of distributed cloud applications including a shutdown schedule; for each of the first plurality of distributed cloud applications, determining whether each distributed cloud application comprises a standard cloud environment or a nonstandard cloud environment; identifying a first subgroup of distributed cloud applications comprising the standard cloud environment and a second subgroup of distributed cloud applications comprising the nonstandard cloud environment; for each distributed cloud application of the first subgroup: executing a shutdown routine based on a respective shutdown schedule associated with each distributed cloud application of the first subgroup; intermittently scanning the shutdown schedule of each distributed cloud application of the first subgroup to determine when to reinitialize each distributed cloud application of the first subgroup; and reinitializing each distributed cloud application of the first subgroup based on the respective shutdown schedule; for each distributed cloud application of the second subgroup; creating a restore point comprising initialization parameters associated with a respective distributed cloud application of the second subgroup; converting the nonstandard cloud environment into a standard cloud environment; executing a shutdown routine based on the respective shutdown schedule associated with each distributed cloud application of the second subgroup; intermittently scanning the shutdown schedule of each distributed cloud application of the second subgroup to determine when to reinitialize each distributed cloud application of the second subgroup; reinitializing each distributed cloud application of the second subgroup based on the shutdown schedule of each distributed cloud application of the second subgroup; and restoring each distributed cloud application of the second subgroup using respective initialization parameters associated with each distributed cloud application of the second subgroup, thereby converting each distributed cloud application of the second subgroup into the nonstandard cloud environment.

Clause 19: The method of clause 18, wherein converting each nonstandard cloud environment into standard cloud environment further comprises determining whether each of the distributed cloud applications of the second subgroup comprise either a read-replica cloud environment or a multi-server cloud environment.

Clause 20: The method of clause 19, wherein converting each nonstandard cloud environment into a standard cloud environment further comprises: identifying a read replica associated with each read-replica cloud environment; deleting the read replica associated with each read-replica cloud environment; and converting each multi-server cloud environment of the second subgroup into a single-server cloud environment.

What is claimed is:

1. A system for managing cloud environments, comprising:
one or more processors;
a memory in communication with the one or more processors storing instructions, that when executed by the one or more processors are configured to cause the system to:
scan a plurality of distributed cloud servers to identify a plurality of distributed cloud applications comprising a scheduler configuration file;
for each distributed cloud application of the identified plurality of distributed cloud applications, determine whether each distributed cloud application comprises a standard cloud environment or a nonstandard cloud environment;
identify a first subgroup of the identified plurality of distributed cloud applications comprising the standard cloud environment and a second subgroup of the identified plurality of distributed cloud applications comprising the nonstandard cloud environment;
shut down each distributed cloud application of the identified first subgroup based on a first plurality of predetermined shutdown schedules associated with each distributed application of the identified first subgroup;
reinitialize each distributed cloud application of the identified first subgroup at a predetermined time based on the first plurality of predetermined shutdown schedules;
create a restore point for each distributed cloud application in the identified second subgroup;
convert each distributed cloud application in the identified second subgroup into a standard cloud environment;
shut down each distributed cloud application of the identified second subgroup based on a second plurality of predetermined shutdown schedules associated with each distributed application of the identified second subgroup;
responsive to shutting down each distributed cloud application of the identified second subgroup, reinitialize each distributed cloud application of the identified second subgroup at a predetermined time based on the second plurality of predetermined shutdown schedules; and
restore each distributed cloud application of the identified second subgroup to the nonstandard cloud environment based on the created restore points.

2. The system of claim 1, wherein converting each nonstandard cloud environment into standard cloud environment further comprises determining whether each of the distributed cloud applications of the identified second subgroup comprise either a read-replica cloud environment or a multi-server cloud environment.

3. The system of claim 2, wherein converting each nonstandard cloud environment into a standard cloud environment further comprises converting each multi-server cloud environment of the identified second subgroup into a single-server cloud environment.

4. The system of claim 2, wherein converting each nonstandard cloud environment into a standard cloud environment further comprises:
identifying a read replica associated with each read-replica cloud environment; and
deleting the read replica associated with each read-replica cloud environment.

5. The system of claim 4, wherein identifying the read replica associated with each read-replica cloud environment further comprises:
scanning each read replica of a plurality of existing read-replicas for a source identifier;
comparing the source identifier to a respective cloud environment identifier associated with each of the distributed cloud applications of the identified second subgroup; and
matching the read replica to one of the distributed cloud applications of the identified second subgroup based on the source identifier matching the respective cloud environment identifier beyond a predetermined threshold.

6. The system of claim 1, wherein intermittently scanning the scheduler configuration files occurs once every fifteen minutes.

7. The system of claim 1, wherein the scheduler configuration files allow the distributed cloud applications to be initialized or shutdown at a time selected from at a beginning of an hour period, 15 minutes past the hour period, 30 minutes past the hour period, or 45 minutes past the hour period.

8. The system of claim 1, wherein the instructions, when executed by the one or more processors are configured to cause the system to:

responsive to a successful reinitialization of a respective distributed cloud application, record a success event to a reporting database confirming that the respective distributed cloud application has been successfully reinitialized; and responsive to a non-successful reinitialization of a respective distributed cloud application, record a failure event to the reporting database.

9. A system for managing cloud environments, comprising:
one or more processors;
a memory in communication with the one or more processors storing instructions, that when executed by the one or more processors are configured to cause the system to:
scan a plurality of distributed cloud servers to identify a plurality of distributed cloud applications comprising a scheduler configuration file;
for each distributed cloud application of the identified plurality of distributed cloud applications, determine whether each distributed cloud application comprises a standard cloud environment or a nonstandard cloud environment;
identify a first subgroup of the identified plurality of distributed cloud applications comprising the standard cloud environment and a second subgroup of the identified plurality of distributed cloud applications comprising the nonstandard cloud environment;
for each distributed cloud application of the identified first subgroup, execute a shutdown routine based on a plurality of first schedules, each of the plurality of first schedules determined from a respective scheduler configuration file associated with each distributed cloud application of the identified first subgroup;
for each distributed cloud application of the identified second subgroup:
create a restore point comprising initialization parameters associated with a respective distributed cloud application;
convert the nonstandard cloud environment into a standard cloud environment; and
execute a shutdown routine based on a plurality of second schedules, each of the plurality of second schedules determined from a respective scheduler configuration file associated with each distributed cloud application of the identified second subgroup.

10. The system of claim 9, wherein the instructions, when executed by the one or more processors are configured to cause the system to:
for each distributed cloud application of the identified first subgroup:
intermittently scan the scheduler configuration files of the identified first subgroup to determine when to reinitialize each distributed cloud application of the identified first subgroup; and
reinitialize each distributed cloud application of the identified first subgroup based on the plurality of first schedules;
for each distributed cloud application of the identified second subgroup:
intermittently scan the scheduler configuration files of the identified second subgroup to determine when to reinitialize each distributed cloud application of the identified second subgroup;

responsive to executing the shutdown routine associated with each distributed cloud application of the identified second subgroup, reinitialize each distributed cloud application of the identified second subgroup based on the plurality of second schedules; and restore each distributed cloud application of the identified second subgroup using respective initialization parameters associated with each distributed cloud application of the identified second subgroup, thereby converting each distributed cloud application of the identified second subgroup into the nonstandard cloud environment.

11. The system of claim 10, wherein converting each nonstandard cloud environment into standard cloud environment further comprises determining whether each of the distributed cloud applications of the identified second subgroup comprise either a read-replica cloud environment or a multi-server cloud environment.

12. The system of claim 11, wherein converting each nonstandard cloud environment into a standard cloud environment further comprises converting each multi-server cloud environment of the identified second subgroup into a single-server cloud environment.

13. The system of claim 11, wherein converting each nonstandard cloud environment into a standard cloud environment further comprises:
identifying a read replica associated with each read-replica cloud environment; and
deleting the read replica associated with each read-replica cloud environment.

14. The system of claim 13, wherein identifying the read replica associated with each read-replica cloud environment further comprises:
scanning each read replica of a plurality of existing read-replicas for a source identifier;
comparing the source identifier to a respective cloud environment identifier associated with each of the distributed cloud applications of the identified second subgroup; and
matching the read replica to one of the distributed cloud applications of the identified second subgroup based on the source identifier matching the respective cloud environment identifier beyond a predetermined threshold.

15. The system of claim 10, wherein intermittently scanning the scheduler configuration files occurs once every fifteen minutes.

16. The system of claim 10, wherein the scheduler configuration files allow the distributed cloud applications to be initialized or shut down at a time selected from at a beginning of an hour period, 15 minutes past the hour period, 30 minutes past the hour period, or 45 minutes past the hour period.

17. The system of claim 10, wherein the instructions, when executed by the one or more processors are configured to cause the system to:
responsive to a successful reinitialization of a respective distributed cloud application, record a success event to a reporting database confirming that the respective distributed cloud application has been successfully reinitialized; and
responsive to a non-successful reinitialization of a respective distributed cloud application, record a failure event to the reporting database.

18. A method for managing cloud environments, comprising:

identifying a first plurality of distributed cloud applications including a shutdown schedule;

for each of the identified first plurality of distributed cloud applications, determining whether each distributed cloud application comprises a standard cloud environment or a nonstandard cloud environment;

identifying a first subgroup of the identified plurality of distributed cloud applications comprising the standard cloud environment and a second subgroup of the identified plurality of distributed cloud applications comprising the nonstandard cloud environment;

for each distributed cloud application of the identified first subgroup:

executing a shutdown routine based on a respective shutdown schedule associated with each distributed cloud application of the identified first subgroup;

intermittently scanning the shutdown schedule of each distributed cloud application of the identified first subgroup to determine when to reinitialize each distributed cloud application of the identified first subgroup; and         reinitializing each distributed cloud application of the identified first subgroup based on the respective shutdown schedule;

for each distributed cloud application of the identified second subgroup;

creating a restore point comprising initialization parameters associated with a respective distributed cloud application of the identified second subgroup;

converting the nonstandard cloud environment into a standard cloud environment;

executing a shutdown routine based on the respective shutdown schedule associated with each distributed cloud application of the identified second subgroup;

intermittently scanning the shutdown schedule of each distributed cloud application of the identified second subgroup to determine when to reinitialize each distributed cloud application of the identified second subgroup;

responsive to executing the shutdown routine associated with each distributed cloud application of the identified second subgroup, reinitializing each distributed cloud application of the identified second subgroup based on the shutdown schedule of each distributed cloud application of the identified second subgroup; and         restoring each distributed cloud application of the identified second subgroup using respective initialization parameters associated with each distributed cloud application of the identified second subgroup, thereby converting each distributed cloud application of the identified second subgroup into the nonstandard cloud environment.

19. The method of claim 18, wherein converting each nonstandard cloud environment into standard cloud environment further comprises determining whether each of the distributed cloud applications of the identified second subgroup comprise either a read-replica cloud environment or a multi-server cloud environment.

20. The method of claim 19, wherein converting each nonstandard cloud environment into a standard cloud environment further comprises:

identifying a read replica associated with each read-replica cloud environment;

deleting the read replica associated with each read-replica cloud environment; and converting each multi-server cloud environment of the identified second subgroup into a single-server cloud environment.

\* \* \* \* \*